United States Patent
Habata et al.

(10) Patent No.: US 11,198,367 B2
(45) Date of Patent: Dec. 14, 2021

(54) HYBRID VEHICLE

(71) Applicant: TOYOTA JIDOSHA KABUSHIKI KAISHA, Toyota (JP)

(72) Inventors: Yohei Habata, Susono (JP); Seiji Kuwahara, Toyota (JP); Akira Ijichi, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/441,078

(22) Filed: Jun. 14, 2019

(65) Prior Publication Data
US 2020/0062128 A1 Feb. 27, 2020

(30) Foreign Application Priority Data
Aug. 23, 2018 (JP) .............................. JP2018-156194

(51) Int. Cl.
*B60L 50/16* (2019.01)
*B60W 20/40* (2016.01)

(52) U.S. Cl.
CPC ............ *B60L 50/16* (2019.02); *B60W 20/40* (2013.01); *B60L 2260/28* (2013.01)

(58) Field of Classification Search
CPC ...... B60L 50/16; B60L 2260/28; B60W 20/40
See application file for complete search history.

(56) References Cited

U.S. PATENT DOCUMENTS

| | | | |
|---|---|---|---|
| 7,661,495 B2* | 2/2010 | Zohrer | B60L 50/16 180/65.22 |
| 8,630,761 B2 | 1/2014 | Severinsky et al. | |
| 8,936,119 B1* | 1/2015 | Valier | B60K 6/40 180/65.21 |
| 2004/0104089 A1 | 6/2004 | Heiartz et al. | |
| 2005/0143210 A1 | 6/2005 | Hamai et al. | |
| 2005/0150700 A1 | 7/2005 | Bordini | |
| 2009/0200094 A1* | 8/2009 | Zohrer | B60K 6/387 180/65.22 |
| 2011/0130901 A1 | 6/2011 | Mori et al. | |
| 2015/0360572 A1* | 12/2015 | Yamamoto | B60L 3/0061 290/45 |

(Continued)

FOREIGN PATENT DOCUMENTS

| | | |
|---|---|---|
| JP | H03-139435 A | 6/1991 |
| JP | 2005-125921 A | 5/2005 |

(Continued)

*Primary Examiner* — Bryan A Evans
(74) *Attorney, Agent, or Firm* — Oliff PLC

(57) ABSTRACT

Provided is a hybrid vehicle including: an engine longitudinally positioned on a front side of a vehicle body; a first motor; a rear wheel to which output torque of the engine and the first motor is transmitted to generate driving power; a second motor; and a front wheel to which output torque of the second motor is transmitted to generate driving power. Both the first motor and the second motor are disposed between the engine and an automatic transmission, coaxially with the engine and the automatic transmission. A power transmission mechanism that increases or decreases the driving power of the front wheel is provided. The second motor is coupled to the power transmission mechanism without being coupled to the engine and the automatic transmission.

12 Claims, 10 Drawing Sheets

(56) References Cited

U.S. PATENT DOCUMENTS

| | | | |
|---|---|---|---|
| 2017/0282919 A1 | 10/2017 | Schieffelin | |
| 2018/0304738 A1 | 10/2018 | Kuwahara | |
| 2019/0193717 A1* | 6/2019 | Komuro | F02D 41/0235 |
| 2019/0202437 A1* | 7/2019 | Paterno | B60K 6/54 |
| 2019/0210590 A1* | 7/2019 | Hoshino | B60W 10/08 |
| 2019/0214931 A1* | 7/2019 | Minegishi | B60L 3/003 |

FOREIGN PATENT DOCUMENTS

| | | |
|---|---|---|
| JP | 2005-349951 A | 12/2005 |
| JP | 2008-515726 A | 5/2008 |
| JP | 2016-002772 A | 1/2016 |
| JP | 2018-177171 A | 11/2018 |
| WO | 2006/034520 A1 | 4/2006 |

* cited by examiner

AXLE DIRECTION

HYBRID VEHICLE

INCORPORATION BY REFERENCE

The disclosure of Japanese Patent Application No. 2018-156194 filed on Aug. 23, 2018 including the specification, drawings and abstract is incorporated herein by reference in its entirety.

BACKGROUND

1. Technical Field

The present disclosure relates to a hybrid vehicle that is equipped with an engine and a motor having an electricity generation function as driving power sources, and that can be driven to travel by the front wheels and the rear wheels.

2. Description of Related Art

Japanese Patent Application Publication No. 2016-2772 (JP 2016-2772 A) describes a hybrid vehicle equipped with an engine and motors as driving power sources. The hybrid vehicle described in JP 2016-2772 A includes: an engine and a rear driving motor that drive rear wheels; a front driving motor that drives front wheels; an electricity-generating motor that generates electricity by using an output of the engine; and an automatic transmission coupled to the rear wheels through a propeller shaft, a differential gear, etc. The engine is disposed on a front side of the vehicle, in so-called longitudinal position with the direction of a rotational axis of a crankshaft oriented along a front-rear direction of the vehicle. The rear driving motor and the automatic transmission are disposed coaxially with the engine. The front driving motor is disposed on an intake side of the engine, parallel to the engine in a vehicle width direction, and is coupled to the front wheels through an output power transmission mechanism.

SUMMARY

As described above, in the hybrid vehicle described in JP 2016-2772 A, the rear wheels are driven by the longitudinally positioned engine and the rear driving motor disposed coaxially with the engine, while the front wheels are driven by the front driving motor disposed parallel to the engine. Thus, the hybrid vehicle described in JP 2016-2772 A is an electrically powered four-wheel-drive (4WD) or all-wheel-drive (AWD) vehicle based on a rear-wheel-drive (FR) vehicle having an engine longitudinally positioned on the front side of the vehicle and a rear driving motor, with a front driving motor for driving the front wheels incorporated into the FR vehicle. The hybrid vehicle described in JP 2016-2772 A has the front driving motor coupled to a front driving shaft through the output power transmission mechanism (transaxle), and therefore does not need a transfer case and a propeller shaft for transmitting power to the front wheels, compared with a conventional electrically powered hybrid 4WD vehicle as shown in FIG. 2 of JP 2016-2772 A. It is mentioned that the hybrid vehicle described in JP 2016-2772 A (shown in FIG. 1 of JP 2016-2772 A) can thereby reduce the impact that adding a front driving motor has on the layout under the vehicle floor or on the layout of the engine exhaust pipe.

While the hybrid vehicle described in JP 2016-2772 A can eliminate the need for a transfer case and a propeller shaft for the front wheels as described above, a transaxle needs to be additionally provided at a coupling part between the front driving motor and the front driving shaft. Moreover, a space to dispose the front driving motor between the engine and the front wheels needs to be secured. Thus, to configure the hybrid vehicle described in JP 2016-2772 A based on an existing FR vehicle, the structure and layout of the existing vehicle body need to be changed to no small extent. This involves design changes, additional facility investment, etc., which would push up the cost.

In the hybrid vehicle described in JP 2016-2772 A, the front driving motor and the power transmission mechanism are disposed adjacent to the engine in the vehicle width direction. As this makes the front side of the vehicle heavier than the rear side, the position of the center of gravity of the vehicle is offset toward the front side from a central part in the vehicle front-rear direction. As a result, the driving stability, the turning characteristics, etc. of the vehicle may be adversely affected.

The present disclosure provides a hybrid vehicle that uses an engine and two motors as driving power sources to drive both the front and rear wheels, by making as few changes as possible to the vehicle body structure or layout of an existing FR vehicle or an FR vehicle-based four-wheel-drive vehicle.

The present disclosure is a hybrid vehicle including: an engine disposed on a front side of a vehicle body, in longitudinal position with a direction of a rotational axis of a crankshaft oriented along a front-rear direction of the vehicle body; an automatic transmission that is disposed coaxially with the engine and increases and decreases engine torque output by the engine; a first motor that functions to generate electricity by being driven by the engine torque; a rear wheel to which at least one of the engine torque and first motor torque output by the first motor is transmitted to generate driving power; a second motor that outputs second motor torque; and a front wheel to which the second motor torque is transmitted to generate driving power. Both the first motor and the second motor are disposed between the engine and the automatic transmission, coaxially with the engine and the automatic transmission. The first motor is coupled to the engine. A power transmission mechanism that increases and decreases the driving power of the front wheel is provided. The second motor is coupled to the power transmission mechanism without being coupled to the engine and the automatic transmission.

In the present disclosure, a starter clutch that permits or interrupts torque transmission between the engine and the automatic transmission may be provided between the engine and the automatic transmission.

In the present disclosure, the automatic transmission may have a clutch mechanism that permits or interrupts torque transmission between an input shaft and an output shaft of the automatic transmission.

In the present disclosure, the first motor and the second motor may be disposed in the order of the second motor and the first motor from a side nearer to the engine in the front-rear direction.

In the present disclosure, a transmission mechanism that varies the second motor torque and then transmits the second motor torque to the front wheel side may be provided between the second motor of a front wheel-side driving system and the front wheel.

In the present disclosure, the first motor and the second motor may be different from each other in maximum outside diameter. The first motor and the second motor may be disposed in the order of one motor of the first motor and the second motor that has a larger maximum outside diameter and the other motor that has a smaller maximum outside diameter, from a side nearer to the engine in the front-rear direction.

In the present disclosure, the power transmission mechanism may have a chain speed reducing mechanism that amplifies the second motor torque in two stages. The chain speed reducing mechanism may have a first chain speed reducing shaft that rotates integrally with a rotating shaft of the second motor, a second chain speed reducing shaft having a lower rotation speed than the first chain speed reducing shaft, and a third chain speed reducing shaft having a lower rotation speed than the second chain speed reducing shaft. The second chain speed reducing shaft and the third chain speed reducing shaft may be disposed on opposite sides of the rotational axis of the crankshaft in a width direction of the vehicle body.

In the present disclosure, the power transmission mechanism may have a speed reducing mechanism that amplifies the second motor torque in two stages. The speed reducing mechanism may have a first speed reducing shaft that rotates integrally with a rotating shaft of the second motor, a second speed reducing shaft having a lower rotation speed than the first speed reducing shaft, and a third speed reducing shaft having a lower rotation speed than the second speed reducing shaft. The third speed reducing shaft may be coupled, so as to be able to transmit power, to a fourth speed reducing shaft that transmits torque to the front wheel through a front wheel-side differential gear coupled to the front wheel.

In the present disclosure, the engine may be a straight engine having a plurality of cylinders disposed in one row in the direction of the rotational axis of the crankshaft. The engine may have an intake side to which an intake system is connected, and an exhaust side which is the opposite side from the intake side in a width direction of the vehicle body and to which an exhaust system is connected. The power transmission mechanism may have a front wheel-side differential gear that is coupled to the front wheel, and a front wheel-side propeller shaft that transmits torque between the second motor and the front wheel-side differential gear. The front wheel-side propeller shaft may be disposed on the intake side in the width direction, with a direction of a rotational axis of the front wheel-side propeller shaft oriented along the front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described with reference to the drawings. The embodiment to be shown below is merely an example of embodying the present disclosure and therefore does not limit the disclosure.

A vehicle that is the subject of the embodiment of the present disclosure is a hybrid vehicle having an engine and first and second motors as driving power sources. The engine and the first motor are coupled to rear wheels so as to be able to transmit power. The first motor is disposed on an output side of the engine, and functions to generate electricity by receiving and being driven by engine torque output by the engine. The second motor is coupled to front wheels so as to be able to transmit power. Thus, the hybrid vehicle in the embodiment of the present disclosure is a four-wheel-drive (4WD) or all-wheel-drive (AWD) vehicle that can generate driving power by both the front and rear wheels. The second motor is not coupled to the engine, the first motor, and the rear wheels, and does not transmit torque to the engine, the first motor, and the rear wheels.

All the driving power sources, i.e., the engine, the first motor, and the second motor, of the hybrid vehicle in the embodiment of the present disclosure are disposed coaxially. The engine is disposed on a front side of the vehicle, in so-called longitudinal position with the direction of a rotational axis of a crankshaft oriented along a front-rear direction of the vehicle. Thus, the hybrid vehicle in the embodiment of the present disclosure can be configured by converting or changing the existing vehicle body structure or layout of a rear-wheel-drive vehicle (FR vehicle) which has an engine disposed in longitudinal position on the front side of the vehicle and of which the rear wheels are driven, a four-wheel-drive vehicle based on such an FR vehicle, or other vehicles.

Figure 1:
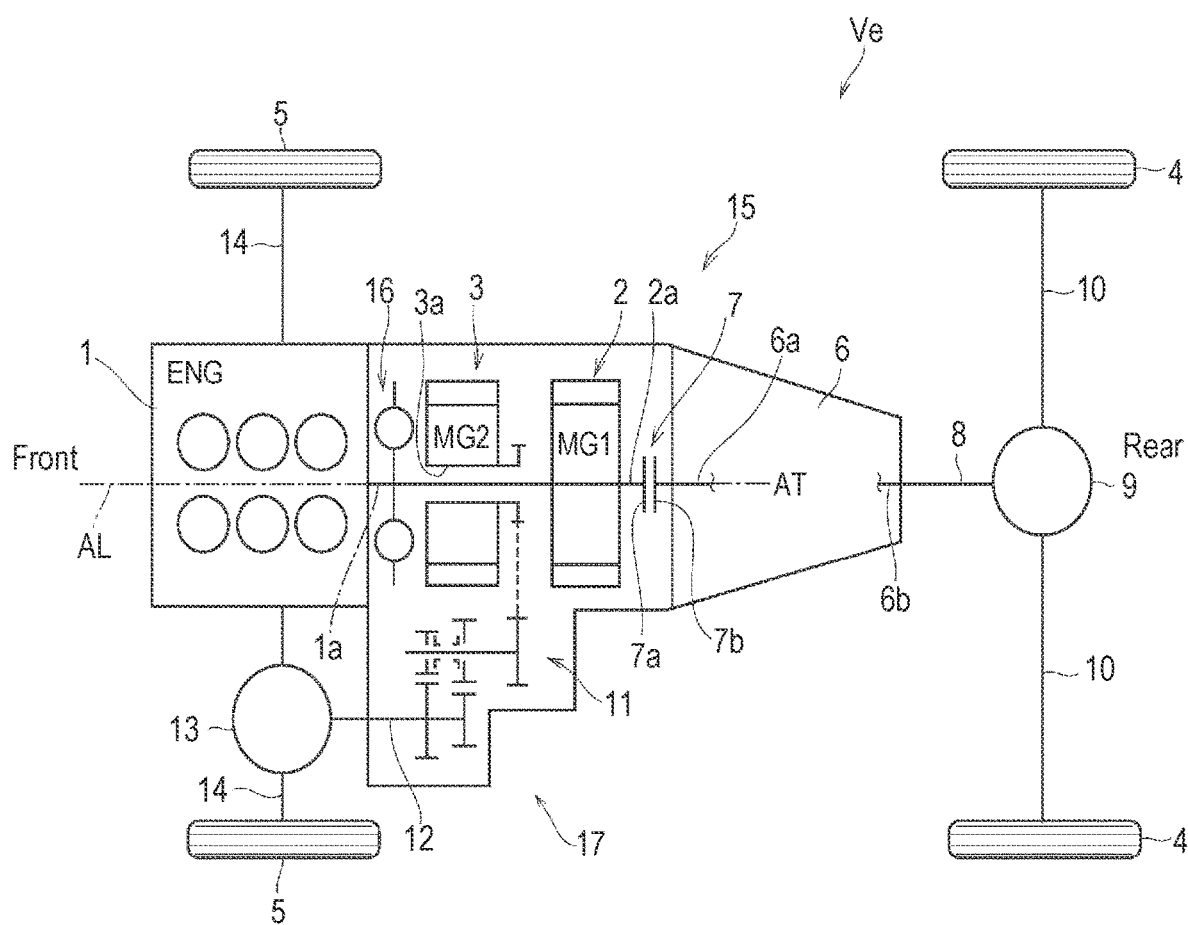
FIG. 1 is a view showing an example (a configuration in which a second motor is disposed on a front side and a first motor is disposed on a rear side) of a hybrid vehicle that is the subject of the present disclosure.

FIG. 1 shows a specific example of the hybrid vehicle in the embodiment of the present disclosure. A hybrid vehicle (hereinafter referred to as the vehicle) Ve shown in FIG. 1 has an engine (ENG) 1, a first motor (MG1) 2, and a second motor (MG2) 3 as driving power sources. The vehicle Ve has, as other main components, rear wheels (driving wheels) 4, front wheels (driving wheels) 5, an automatic transmission (AT) 6, and a starter clutch 7.

For example, the engine 1 is an internal combustion engine, such as a gasoline engine or a diesel engine, and is configured such that the adjustment of output and the operating state including start and stop are electrically controlled. In the case of a gasoline engine, a throttle valve opening degree, a fuel supply amount or a fuel injection amount, execution and stop of ignition, ignition timing, etc. are electrically controlled. In the case of a diesel engine, a fuel injection amount, fuel injection timing, a throttle valve opening degree in an exhaust gas recirculation (EGR) system, etc. are electrically controlled. As described above, the engine 1 is disposed in so-called longitudinal position with the direction of a rotational axis AL of a crankshaft (or an output shaft) 1a oriented along the front-rear direction of the vehicle Ve (the right-left direction in FIG. 1).

Figure 2:
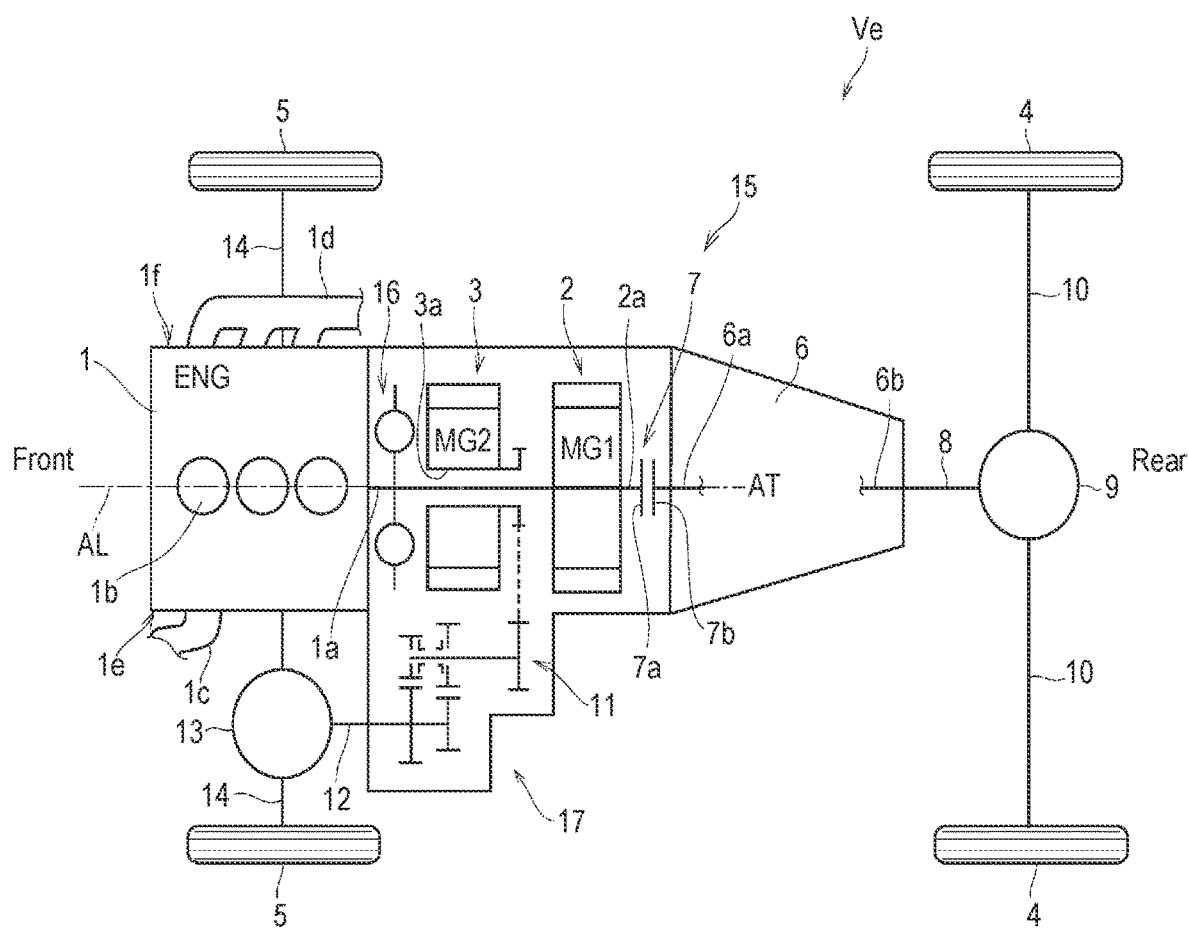
FIG. 2 is a view showing another example (a configuration in which a straight engine is installed) of the hybrid vehicle that is the subject of the present disclosure.

Various types of engines with different arrangements of cylinders, for example, a straight engine, V-engine, and horizontally opposed engine, can be adopted as the engine 1. FIG. 1 shows an example in which a V-engine is used as the engine 1. FIG. 2 shows an example in which a straight engine is used as the engine 1. In the example shown in FIG. 2, the engine 1 has a plurality of cylinders 1b. The cylinders 1b are disposed in one row in the direction of the rotational axis AL of the crankshaft 1a. In particular, when a straight engine is used as the engine 1, the engine 1 includes an intake system 1c that supplies air along with fuel to a combustion chamber (not shown) of the engine 1, and an exhaust system 1d that discharges exhaust gas resulting from combustion, as shown in FIG. 2. The intake system 1c is connected to an intake side 1e of the engine 1 that is a side part of the engine 1 on one side in a width direction of the vehicle body (the lower side in FIG. 2). The exhaust system 1d is connected to an exhaust side 1f of the engine 1 that is a side part of the engine 1 on the other side in the width direction of the vehicle body (the upper side in FIG. 2). Thus, in the example of the straight engine shown in FIG. 2, the engine 1 has the intake side 1e to which the intake system 1c is connected, and the exhaust side 1f which is the opposite side from the intake side 1e in the width direction of the vehicle body and to which the exhaust system 1d is connected.

The first motor 2 is disposed on the output side of the engine 1 (the right side in FIG. 1 and FIG. 2), coaxially with the engine 1. The first motor 2 functions at least as an electricity generator that generates electricity by receiving and being driven by engine torque output by the engine 1. In the vehicle Ve in the embodiment of the present disclosure, the first motor 2 functions also as a prime mover that outputs motor torque (first motor torque) by being supplied with and driven by electricity. Thus, the first motor 2 is a motor having an electricity generation function (so-called motor-generator), and is formed by, for example, a permanent-magnet synchronous motor or an induction motor. A battery (not shown) is connected to the first motor 2 through an inverter (not shown). It is therefore possible to drive the first motor 2 as an electricity generator and store the electricity generated during that time in the battery. It is also possible to supply electricity stored in the battery to the first motor 2 and drive the first motor 2 as a prime mover to output motor torque.

The second motor 3 is disposed on the output side of the engine 1, coaxially with the engine 1 and the first motor 2. In the examples shown in FIG. 1 and FIG. 2, the second motor 3 and the first motor 2 are disposed in this order from the side nearer to the engine 1 (the left side in FIG. 1 and FIG. 2) on a rotational axis of the engine 1, i.e., the rotational axis AL. The second motor 3 functions at least as a prime mover that outputs motor torque (second motor torque) by being supplied with and driven by electricity. In the vehicle Ve in the embodiment of the present disclosure, the second motor 3 functions also as an electricity generator that generates electricity by receiving and being driven by torque from outside. Thus, like the first motor 2, the second motor 3 is a motor having an electricity generation function (so-called motor-generator), and is formed by, for example, a permanent-magnet synchronous motor or an induction motor. A battery (not shown) is connected to the second motor 3 through an inverter (not shown). It is therefore possible to supply electricity stored in the battery to the second motor 3 and drive the second motor 3 as a prime mover to output motor torque. As will be described later, the second motor 3 is coupled to the front wheels 5 so as to be able to transmit power. It is therefore also possible to drive the second motor 3 as an electricity generator by torque transmitted from the front wheels 5, and store regenerated electricity generated during that time in the battery. The first motor 2 and the second motor 3 are connected to each other through an inverter so as to be able to exchange electricity with each other. It is also possible, for example, to directly supply electricity generated by the first motor 2 to the second motor 3 and output motor torque by the second motor 3.

The rear wheels 4 are driving wheels to which driving torque output by a driving power source is transmitted to generate driving power for the vehicle Ve. In the examples shown in FIG. 1 and FIG. 2, the rear wheels 4 are coupled to the engine 1 and the first motor 2 through the automatic transmission 6 and the starter clutch 7 to be described later, and through a rear propeller shaft 8, a rear differential gear 9, and a rear driving shaft 10.

Like the rear wheels 4, the front wheels 5 are driving wheels to which driving torque output by a driving power source is transmitted to generate driving power for the vehicle Ve. In the examples shown in FIG. 1 and FIG. 2, the front wheels 5 are coupled to the second motor 3 through the power transmission mechanism 11 to be described later, a front propeller shaft 12, a front differential gear 13, and a front driving shaft 14. Thus, the vehicle Ve is a four-wheel-drive vehicle or an all-wheel-drive vehicle in which driving torque is transmitted to both the front wheels 5 and the rear wheels 4 to generate driving power.

The automatic transmission 6 is disposed on the output side of the engine 1, coaxially with the engine 1 and the first motor 2. In the examples shown in FIG. 1 and FIG. 2, the automatic transmission 6 is disposed on the output side of the first motor 2 (the right side in FIG. 1 and FIG. 2) on the rotational axis AL, and transmits torque between the engine 1 and the first motor 2 on one side and the rear wheels 4 on the other side. In brief, the automatic transmission 6 is a mechanism that can appropriately change the ratio of an input rotation speed to an output rotation speed, and is formed by an automatically controllable transmission, such as a conventional automatic transmission or a continuously variable transmission. More preferably, the automatic transmission 6 includes a clutch mechanism that is engaged to permit torque transmission and disengaged to interrupt torque transmission and set a neutral state.

The starter clutch 7 is disposed on the output side of the engine 1, coaxially with the engine 1 and the first motor 2. In the examples shown in FIG. 1 and FIG. 2, the starter clutch 7 is disposed between the first motor 2 and the automatic transmission 6 on the rotational axis AL. The starter clutch 7 selectively permits or interrupts power transmission by a rear wheel-side driving system 15 located between the engine 1 and the first motor 2 on one side and the rear wheels 4 on the other side. In the examples shown in FIG. 1 and FIG. 2, the starter clutch 7 has a friction disc 7a coupled to a rotating member on the side of the engine 1 and the first motor 2, and a friction disc 7b coupled to a rotating member on the side of the rear wheels 4. When the friction disc 7a and the friction disc 7b of the starter clutch 7 are engaged with each other, torque is transmitted by the rear wheel-side driving system 15. As the starter clutch 7 is disengaged, the engine 1 and the first motor 2 are disconnected from the rear wheel-side driving system 15. As the starter clutch 7 is engaged, the engine 1 and the first motor 2 are coupled to the rear wheel-side driving system 15.

The friction disc 7a of the starter clutch 7 is coupled to a rotating shaft 2a of the first motor 2. The rotating shaft 2a is coupled to the output shaft (crankshaft) 1a of the engine 1 through a damper 16. Thus, the output shaft 1a of the engine 1, the rotating shaft 2a of the first motor 2, and the friction disc 7a of the starter clutch 7 are coupled together.

On the other hand, the friction disc 7b of the starter clutch 7 is coupled to an input shaft 6a of the automatic transmission 6. An output shaft 6b of the automatic transmission 6 is coupled to the rear wheels 4 through the rear propeller shaft 8, the rear differential gear 9, and the rear driving shaft 10. Thus, the friction disc 7b of the starter clutch 7 and the rear wheels 4 are coupled together through the automatic transmission 6 so as to be able to transmit power.

Although this is not shown in FIG. 1 and FIG. 2, the starter clutch 7 in the embodiment of the present disclosure can also be formed by a multiple-disc clutch which has a plurality of friction discs 7a and a plurality of friction disc 7b and in which the friction discs 7a and the friction discs 7b are alternately disposed. In brief, for example, a friction clutch of which the torque transmission capacity can be continuously varied is used as the starter clutch 7 in the embodiment of the present disclosure. It is possible to smoothly transmit power by controlling the engagement state of the starter clutch 7 and continuously varying the torque transmission capacity of the starter clutch 7 when transmitting the engine torque of the engine 1 to the rear wheels 4. Or it is possible to smoothly start the vehicle Ve.

In the vehicle Ve in the embodiment of the present disclosure, the engine 1 and the first motor 2 are coupled together in the rear wheel-side driving system 15 as described above. This makes it possible to start the vehicle Ve by the engine torque of the engine 1 or smoothly transmit power without using the starter clutch 7. For example, it is possible to start the vehicle Ve or smoothly transmit power without using the starter clutch 7, by controlling so as to increase or decrease the engine torque by the first motor when transmitting the engine torque to the rear wheels 4. However, when the vehicle travels steadily by the engine torque at an extremely low speed of, say, about 1 km per hour to 3 km per hour, a difference in rotation speed occurs between the idling speed of the engine 1 and the wheel speed. In such a case, the starter clutch 7 can be used to absorb the difference in rotation speed and thereby allow for smoother power transmission.

In the vehicle Ve in the embodiment of the present disclosure, the second motor 3 is disposed between the engine 1 and the first motor 2 on the rotational axis AL of the driving power sources as described above. The second motor 3 is coupled to a driving system on the side of the front wheels 5 of the vehicle Ve, such that the motor torque output by the second motor 3 can be transmitted to the front wheels 5 to generate driving power. The second motor 3 is not coupled to the engine 1, the first motor 2, and the rear wheels 4, and does not transmit power to the engine 1, the first motor 2, and the rear wheels 4. In the examples shown in FIG. 1 and FIG. 2, a rotating shaft 3a of the second motor 3 is formed as a hollow shaft, and the output shaft 1a of the engine 1 is inserted in a hollow part of the rotating shaft 3a so as to be able to rotate relative to the rotating shaft 3a. Thus, the second motor 3 is disposed coaxially with the engine 1 and the first motor 2 on the rotational axis AL. On the other hand, the second motor 3 is disconnected from the rear wheel-side driving system 15 between the engine 1 and the first motor 2 on one side and the rear wheels 4 on the other side, and does not transmit power to the engine 1, the first motor 2, and the rear wheels 4.

The rotating shaft 3a of the second motor 3 is coupled to the front wheels 5 through the power transmission mechanism 11, the front propeller shaft 12, the front differential gear 13, and the front driving shaft 14. The motor torque output by the second motor 3 is transmitted to the front wheels 5 after being amplified by the power transmission mechanism 11 and the front differential gear 13. Thus, the second motor 3 constitutes a part of a front wheel-side driving system 17 that transmits power between the second motor 3 and the front wheels 5, along with the power transmission mechanism 11, the front propeller shaft 12, the front differential gear 13, the front driving shaft 14, etc. The front wheel-side driving system 17 is independent of the rear wheel-side driving system 15.

It is possible for the vehicle Ve, with the engine 1 turned off, to generate driving power by transmitting the motor torque output by the second motor 3 to the front wheels 5. It is also possible, with the starter clutch 7 disengaged, to generate electricity by operating the engine 1 and driving the first motor 2 by the engine torque, as well as to generate driving power by transmitting the motor torque of the second motor 3 to the front wheels 5. Further, it is also possible, with the starter clutch 7 engaged, to generate driving power by operating the engine 1 and transmitting the engine torque to the rear wheels 4 and by transmitting the motor torque of the second motor 3 to the front wheels 5.

The power transmission mechanism 11 is a transmission mechanism that varies the motor torque output by the second motor 3 and then transmits the motor torque to the front propeller shaft 12. For example, the power transmission mechanism 11 is formed by a speed reducing gear pair. Alternatively, the power transmission mechanism 11 can be formed by a speed reducing mechanism combining a plurality of speed reducing gear pairs. In the examples shown in FIG. 1 and FIG. 2, a speed reducing mechanism that is composed of a chain power transmission mechanism, a plurality of speed reducing gear pairs, a switching clutch, etc. and varies speed in two stages is used as the power transmission mechanism 11.

As described above, in the vehicle Ve in the embodiment of the present disclosure, both the first motor 2 and the second motor 3 are disposed coaxially with the engine 1 that is longitudinally positioned on the front side of the vehicle Ve. Thus, the motors can be installed with high efficiency in an existing FR vehicle or an FR vehicle-based four-wheel-drive vehicle.

In the vehicle Ve using a straight engine as shown in FIG. 2, the intake system 1*c* and the exhaust system 1*d* of the longitudinally positioned engine 1 are connected separately to the intake side 1*e* and the exhaust side if of the engine 1 in the width direction of the vehicle body as described above. The front propeller shaft 12 of the front wheel-side driving system 17 is disposed adjacent to the engine 1, on the intake side 1*e* of the engine 1 in the width direction of the vehicle body. Thus, the front propeller shaft 12 and the front wheel-side driving system 17 can be disposed by effectively using the space around the intake side 1*e* on the opposite side from the exhaust system 1*d*, which includes an exhaust pipe and a catalyst, so as to avoid interference with the exhaust system 1*d*. It is possible to install particularly the front wheel-side driving system 17 with higher efficiency without making major changes to the vehicle body structure or layout of an existing vehicle.

In the vehicle Ve shown in FIG. 1 and FIG. 2, the second motor 3 is disposed nearer to the engine 1 in the front-rear direction of the vehicle Ve. The engine 1 is disposed in longitudinal position on the front side of the vehicle Ve (the left side in FIG. 1 and FIG. 2). In other words, the second motor 3 is disposed nearer to the front wheels 5 in the front-rear direction of the vehicle Ve than when the second motor 3 is disposed, for example, on the output side of the first motor 2. In the vehicle Ve shown in FIG. 1 and FIG. 2, therefore, the distance between the second motor 3 and the front wheels 5 in the front wheel-side driving system 17 can be reduced. For example, the length of the front propeller shaft 12 in the front wheel-side driving system 17 can be reduced. As the front propeller shaft 12 is shortened, the size and weight of the driving unit can be reduced. Moreover, shortening the front propeller shaft 12 can raise the natural frequency of a rotating and vibrating system including the front propeller shaft 12. As a result, for example, resonance in the front wheel-side driving system 17 during normal travel (during cruise or constant-speed travel) can be reduced, and the NV performance of the vehicle Ve can be improved. In addition, the amount of torsion of the front propeller shaft 12 during power transmission can be reduced. As a result, the responsiveness of driving power in the front wheel-side driving system 17 can be improved.

The configuration of the vehicle Ve in the embodiment of the present disclosure is not limited to the configurations shown in FIG. 1 and FIG. 2. For example, the configurations shown in FIG. 3 to FIG. 10 to be described below can also be adopted. In the vehicle Ve shown in these drawings, those components that have the same configuration or function as in the vehicle Ve shown in FIG. 1 or FIG. 2 or the vehicle Ve shown in any one of the preceding drawings will be denoted by the same reference signs as in FIG. 1 or FIG. 2 or that preceding drawing.

Figure 3:
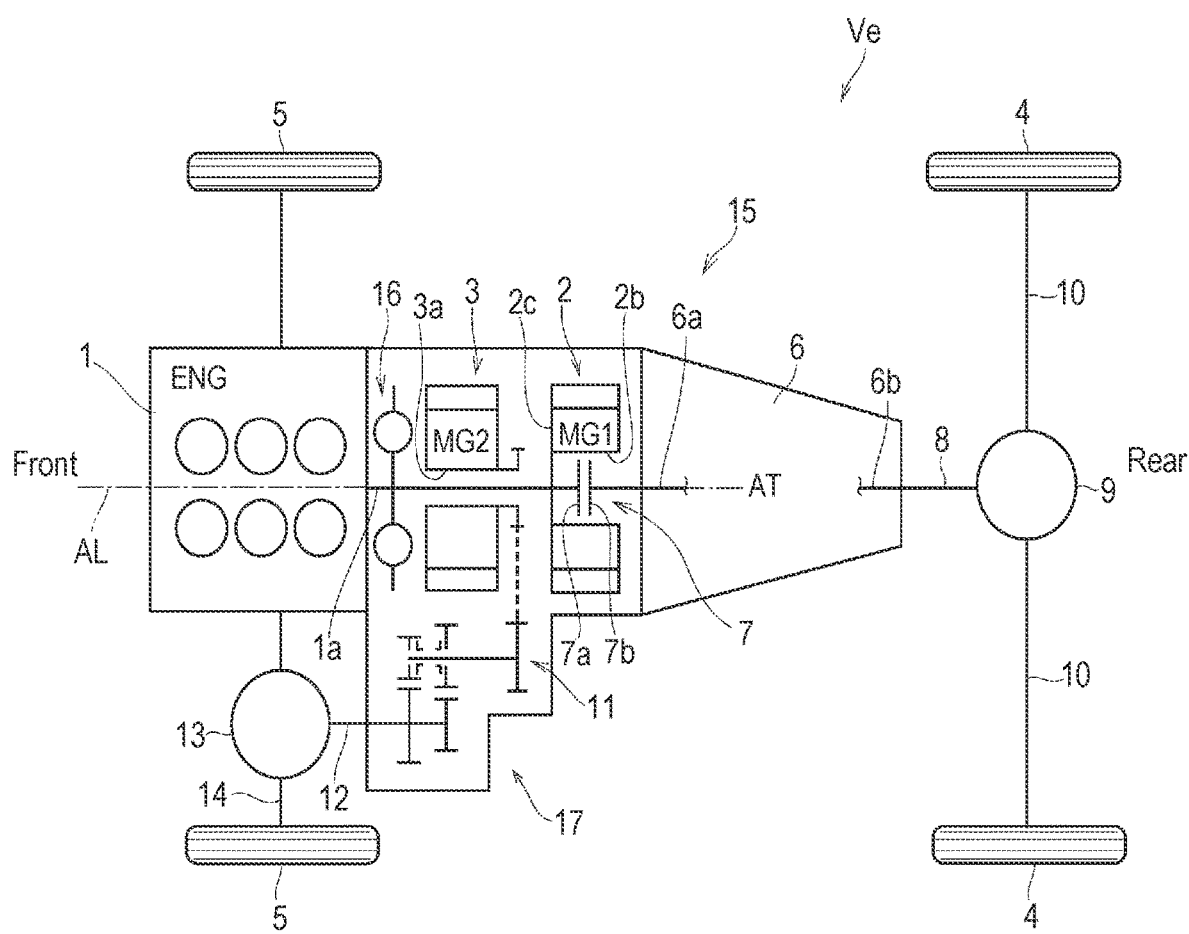
FIG. 3 is a view showing another example (a configuration in which the second motor is disposed on the front side and the first motor is disposed on the rear side, and a starter clutch is disposed on a radially inner side of the first motor) of the hybrid vehicle that is the subject of the present disclosure.

In the vehicle Ve shown in FIG. 3, the starter clutch 7 is disposed in a radially inner part of the first motor 2. Specifically, in the example shown in FIG. 3, a rotating shaft 2*b* of the first motor 2 has a hollowed shape, and the starter clutch 7 is disposed inside a hollow part of the rotating shaft 2*b*. The friction disc 7*a* of the starter clutch 7 is coupled to an end 2*c* of the rotating shaft 2*b* on the side nearer to the second motor 3 (the left side in FIG. 3). The friction disc 7*b* of the starter clutch 7 is coupled to the input shaft 6*a* of the automatic transmission 6 as described above. The input shaft 6*a* is inserted in the hollow part of the rotating shaft 2*b* so as to be able to rotate relative to the rotating shaft 2*b*. Thus, the starter clutch 7 is disposed coaxially with the engine 1, the first motor 2, and the second motor 3 on the rotational axis AL.

If the starter clutch 7 is disposed in the hollow part of the rotating shaft 2*b* of the first motor 2 as in the example shown in FIG. 3, the overall length of the rear wheel-side driving system 15 from the engine 1 to the rear wheels 4 can be reduced. This makes it possible to avoid interference with, for example, a structure under the floor of the vehicle body, or increase the flexibility of installation in an existing vehicle body, when converting an existing vehicle body structure or layout. As a result, the motors can be installed with higher efficiency in an existing FR vehicle or an FR vehicle-based four-wheel-drive vehicle.

Figure 4:
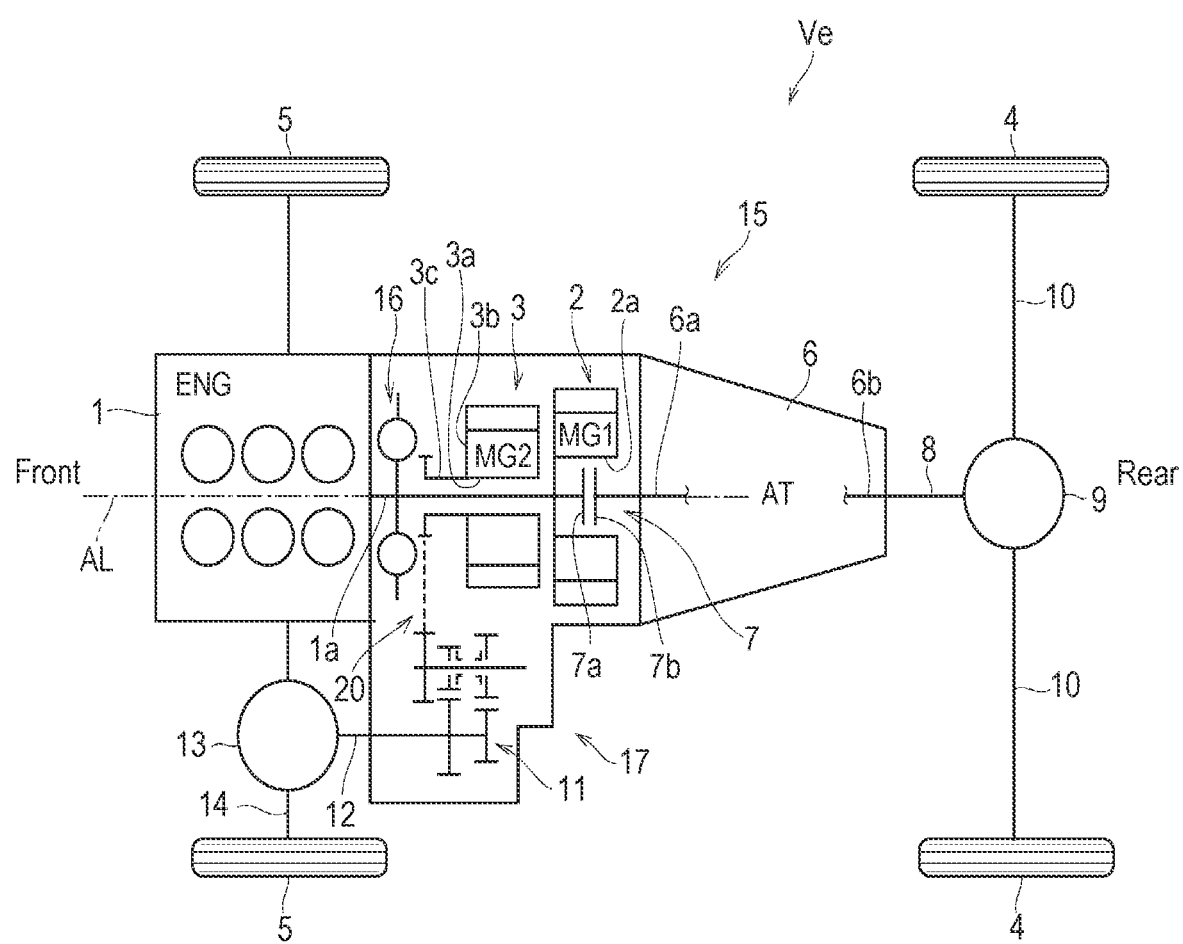
FIG. 4 is a view showing another example (a configuration in which the second motor is disposed on the front side and the first motor is disposed on the rear side, and a power transmission mechanism between the second motor and front wheels is disposed nearer to the front wheels) of the hybrid vehicle that is the subject of the present disclosure.

The vehicle Ve shown in FIG. 4 is configured such that power transmission between the second motor 3 and the power transmission mechanism 11 is performed on the side of the second motor 3 nearer to the engine 1 (the left side in FIG. 4). Specifically, in the example shown in FIG. 4, a protrusion 3*c* protruding toward the engine 1 in the direction of the rotational axis AL is formed on an end 3*b* of the rotating shaft 3*a* of the second motor 3 on the side nearer to the engine 1. The protrusion 3*c* and the power transmission mechanism 11 are coupled together through a gear power transmission mechanism, a chain power transmission mechanism, or the like so as to be able to transmit power. In the example shown in FIG. 4, the protrusion 3*c* and the power transmission mechanism 11 are coupled together through a chain power transmission mechanism 20. Like the rotating shaft 3*a*, the protrusion 3*c* has a hollowed shape.

If the vehicle Ve is configured such that power transmission between the second motor 3 and the power transmission mechanism 11 is performed on the side of the second motor 3 nearer to the engine 1 as in the example shown in FIG. 4, the space inside the engine compartment can be effectively used to dispose the power transmission mechanism 11. Thus, the second motor 3 can be installed with higher efficiency in an existing FR vehicle or an FR vehicle-based four-wheel-drive vehicle.

Figure 5:
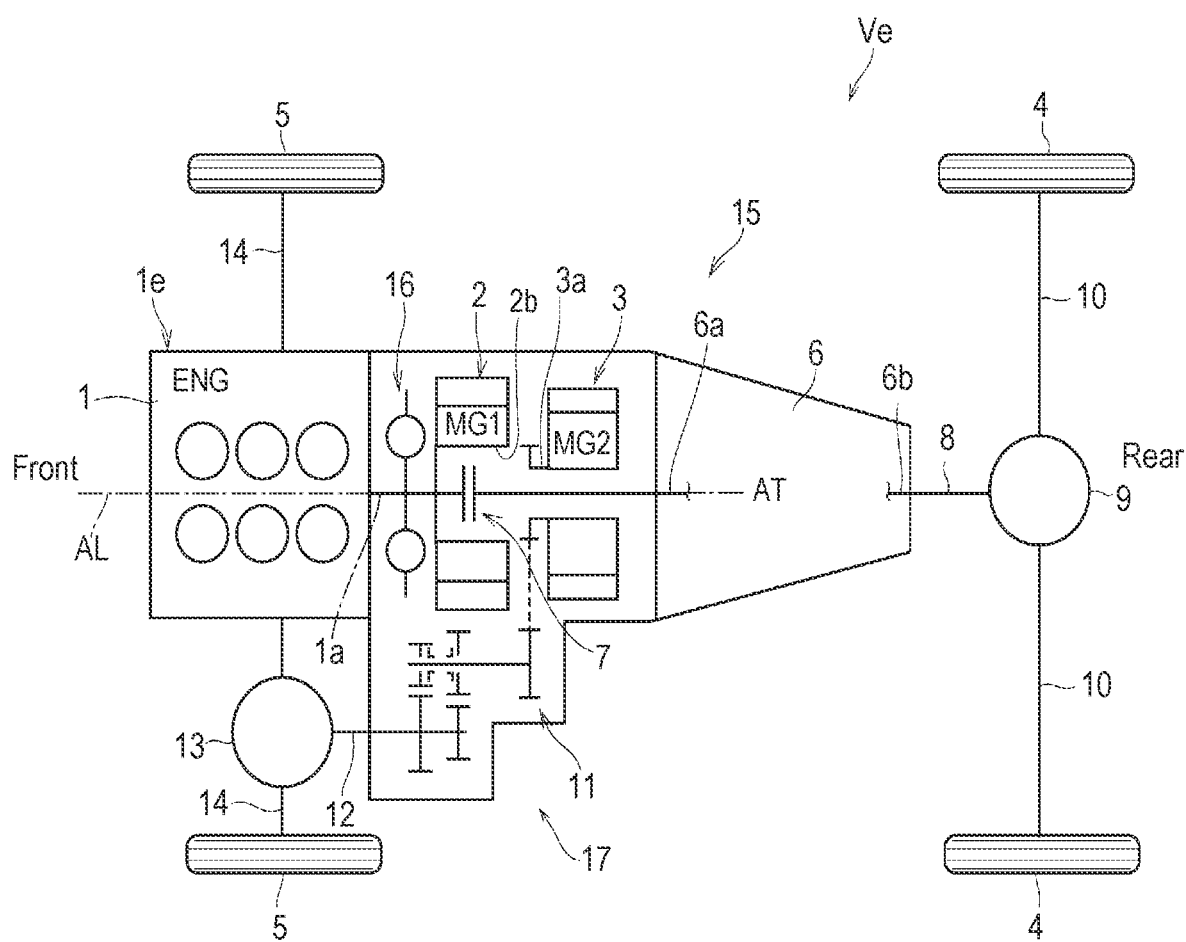
FIG. 5 is a view showing another example (a configuration in which a large-diameter first motor is disposed on the front side and a small-diameter second motor is disposed on the rear side, and a starter clutch is disposed on a radially inner side of the first motor) of the hybrid vehicle that is the subject of the present disclosure.

In the vehicle Ve shown in FIG. 5, the first motor 2 and the second motor 3 are disposed in the order of the first motor 2 and the second motor 3 from the side nearer to the engine 1 (the left side in FIG. 5) on the rotational axis AL. In the example shown in FIG. 5, the first motor 2 has a larger maximum outside diameter than the second motor 3. Thus, in the vehicle Ve shown in FIG. 5, the first motor 2 and the second motor 3 are disposed in the order of one motor of the first motor 2 and the second motor 3 that has a larger maximum outside diameter (the first motor 2 in the example shown in FIG. 5) and the other motor that has a smaller maximum outside diameter (the second motor 3 in the example shown in FIG. 5), from the side nearer to the engine 1 in the front-rear direction of the vehicle Ve.

If one of two motors installed as driving power sources that has a larger maximum outside diameter is disposed on the side nearer to the engine 1 as in the example shown in FIG. 5, the space inside the engine compartment can be effectively used to dispose the motor having a larger maximum outside diameter. Moreover, the outer shapes (contours) of the hybrid driving unit having the engine 1, the first motor 2, and the second motor 3 as driving power sources can be made to conform to the shape of a floor tunnel of a common vehicle body. Thus, the motors can be installed with high efficiency in an existing FR vehicle or an FR vehicle-based four-wheel-drive vehicle. As in the example shown in FIG. 3, so in the vehicle Ve shown in FIG. 5, the starter clutch 7 is disposed in the hollow part of the rotating shaft 2b of the first motor 2. Therefore, the overall length of the rear wheel-side driving system 15 can be reduced.

Figure 6:
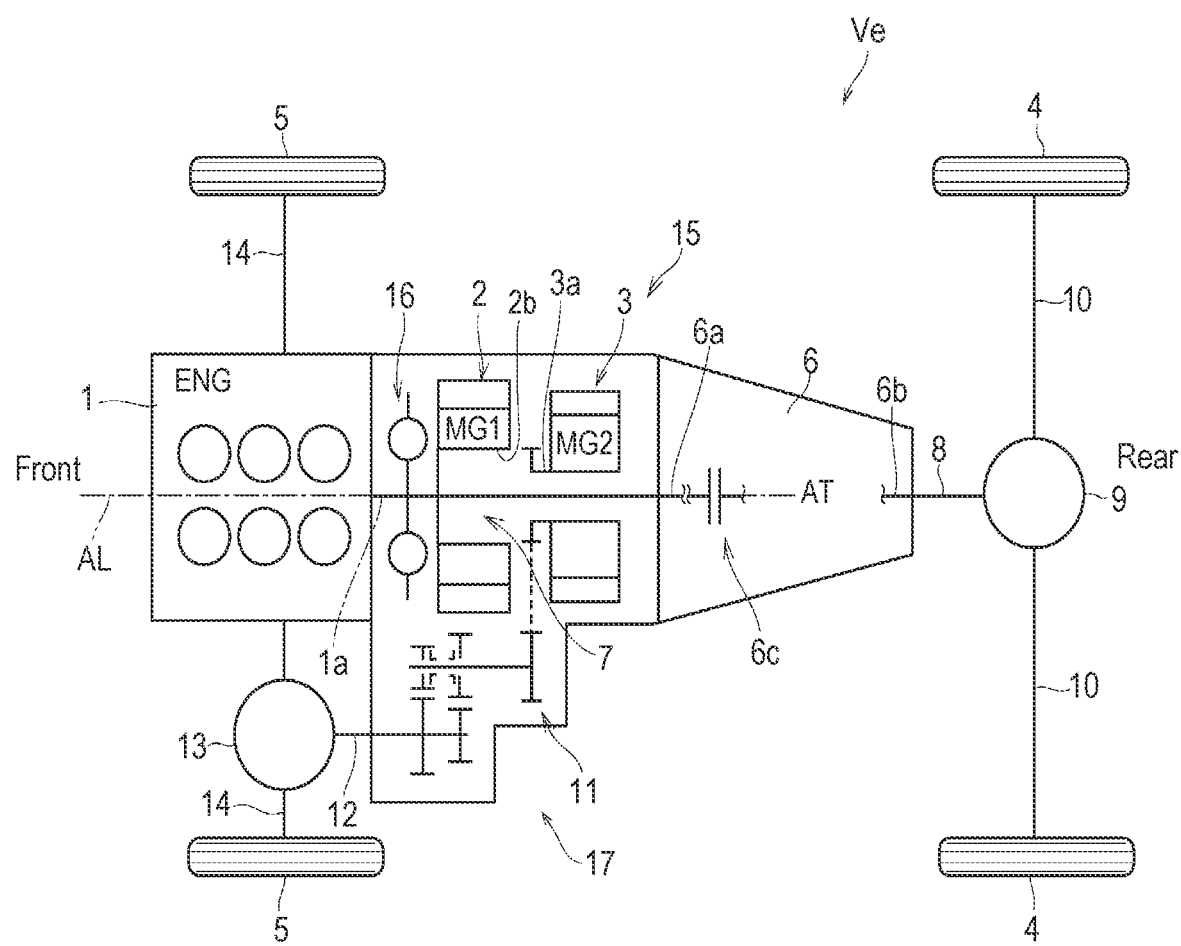
FIG. 6 is a view showing another example (a configuration in which the first motor is disposed on the front side and the second motor is disposed on the rear side, and a clutch mechanism of an automatic transmission disposed on an output side of the second motor functions as a starter clutch) of the hybrid vehicle that is the subject of the present disclosure.

In the vehicle Ve shown in FIG. 6, a clutch mechanism 6c provided inside the automatic transmission 6 functions as a starter clutch, and the starter clutch 7 is omitted. Specifically, in the example shown in FIG. 6, the automatic transmission 6 has the clutch mechanism 6c that selectively permits or interrupts power transmission between the input shaft 6a and the output shaft 6b of the automatic transmission 6. The clutch mechanism 6c is engaged to permit torque transmission and disengaged to interrupt torque transmission and set the automatic transmission 6 to a neutral state. The torque transmission capacity of the clutch mechanism 6c can be continuously varied.

If the clutch mechanism 6c of the automatic transmission 6 functions as a starter clutch as in the example shown in FIG. 6, the starter clutch 7 can be omitted. Thus, the overall length of the rear wheel-side driving system 15 from the engine 1 to the rear wheels 4 can be reduced. As a result, the motors can be installed with higher efficiency in an existing FR vehicle or an FR vehicle-based four-wheel-drive vehicle.

Figure 7:
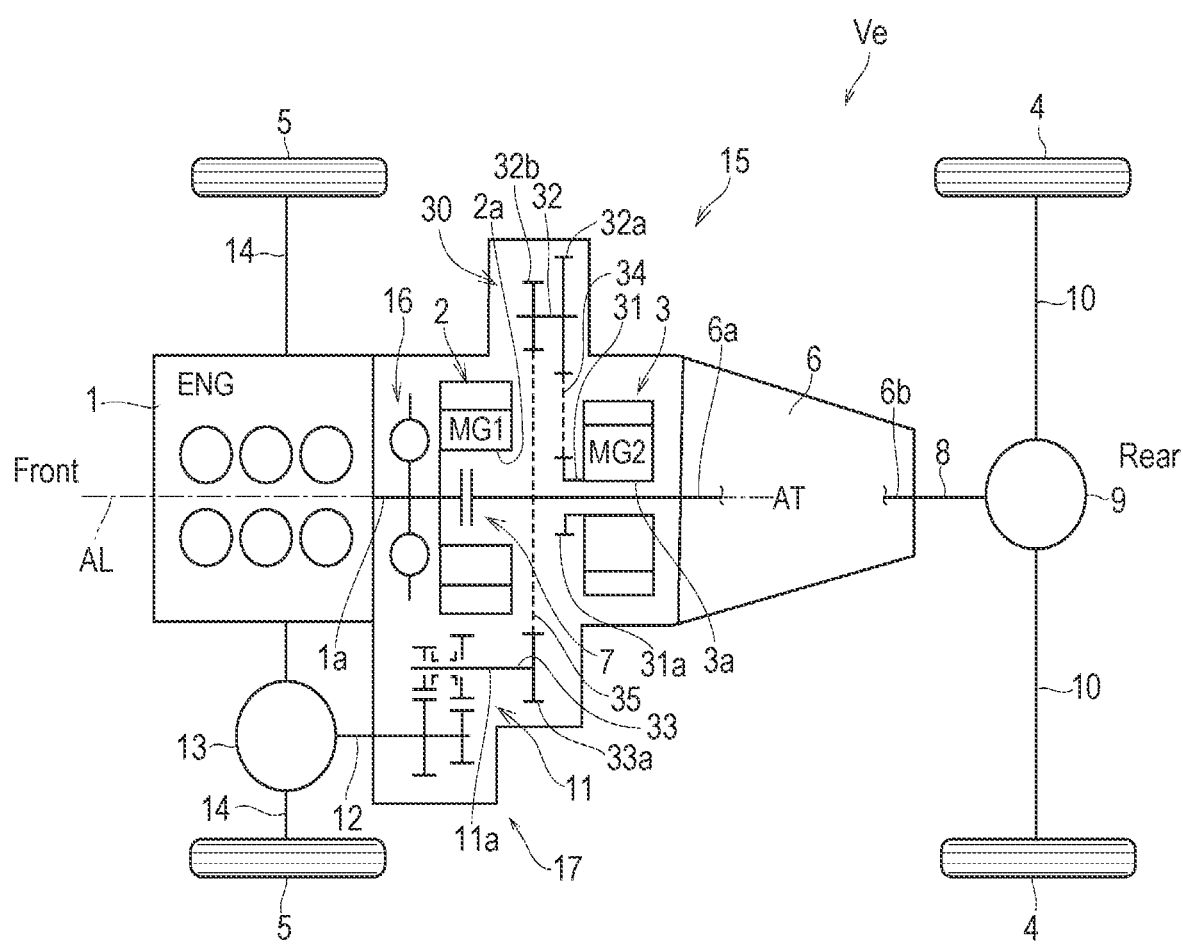
FIG. 7 is a view showing another example (a configuration in which the first motor is disposed on the front side and the second motor is disposed on the rear side, and a two-stage chain speed reducing mechanism is provided between the second motor and the front wheels) of the hybrid vehicle that is the subject of the present disclosure.

The vehicle Ve shown in FIG. 7 includes a chain speed reducing mechanism 30 that amplifies the output torque of the second motor 3 in two stages, between the engine 1 and the automatic transmission 6, between the second motor 3 and the front wheels 5. Specifically, in the example shown in FIG. 7, the chain speed reducing mechanism 30 is provided between the second motor 3 and the power transmission mechanism 11. The chain speed reducing mechanism 30 has a first chain speed reducing shaft 31, a second chain speed reducing shaft 32 having a lower rotation speed than the first chain speed reducing shaft 31, and a third chain speed reducing shaft 33 having a lower rotation speed than the second chain speed reducing shaft 32. The first chain speed reducing shaft 31 is formed so as to rotate integrally with the rotating shaft 3a of the second motor 3, and has a sprocket 31a mounted at a leading end (the end on the left side in FIG. 7). The second chain speed reducing shaft 32 is disposed parallel to the first chain speed reducing shaft 31 in the vehicle width direction, and has a sprocket 32a, having a larger diameter than the sprocket 31a, mounted at an end on one side (the right side in FIG. 7), and a sprocket 32b, having a smaller diameter than a sprocket 33a of the third chain speed reducing shaft 33 to be described later, mounted at an end on the other side (the left side in FIG. 7). The third chain speed reducing shaft 33 is formed so as to rotate integrally with an input shaft 11a of the power transmission mechanism 11, and has the sprocket 33a mounted at a leading end (the end on the right side in FIG. 7). A chain 34 is wound between the sprocket 31a and the sprocket 32a, and a chain 35 is wound between the sprocket 32b and the sprocket 33a. Accordingly, the second chain speed reducing shaft 32 has a lower rotation speed than the first chain speed reducing shaft 31. The third chain speed reducing shaft 33 has a lower rotation speed than the second chain speed reducing shaft 32. Thus, the chain speed reducing mechanism 30 amplifies the output torque of the second motor 3 in two stages between the second motor 3 and the front wheels 5.

In the vehicle Ve shown in FIG. 7, the second chain speed reducing shaft 32 and the third chain speed reducing shaft 33 are disposed with the rotational axis AL therebetween, separately on both end sides in the width direction of the vehicle body (the up-down direction in FIG. 7). In other words, the second chain speed reducing shaft 32 and the third chain speed reducing shaft 33 are disposed on the opposite sides of the rotational axis AL.

Figure 8:
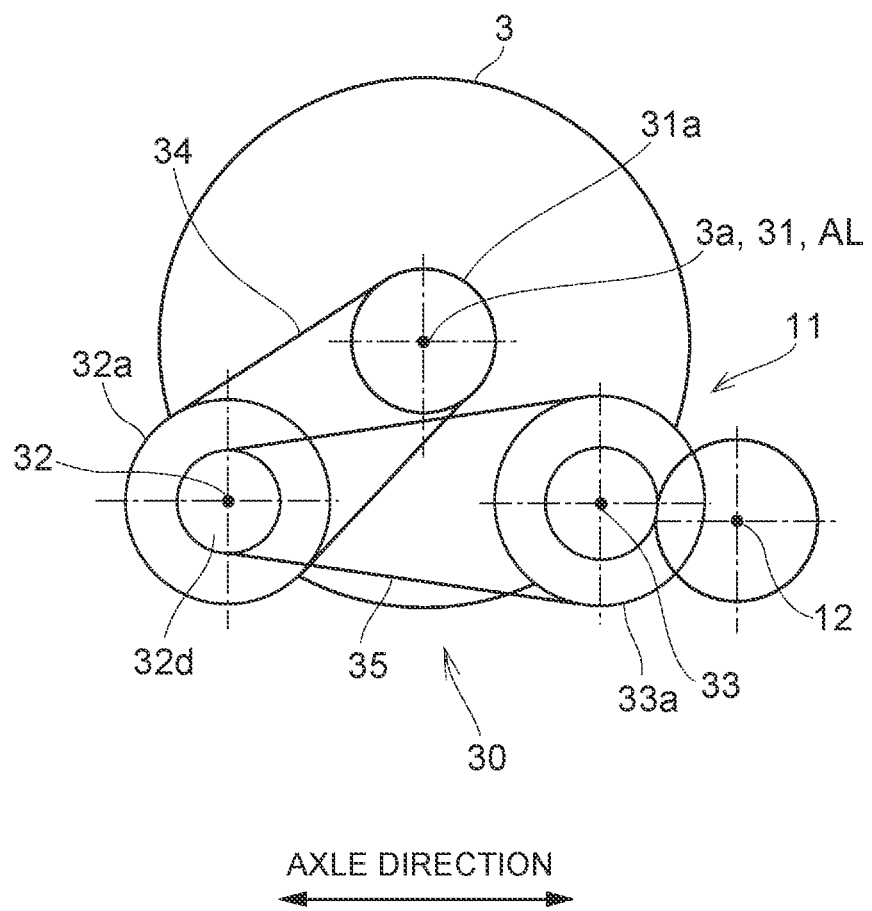
FIG. 8 is a view of the configuration shown in FIG. 7, as seen from the vehicle front side, showing the positional relationship among rotating shafts of the chain speed reducing mechanism.

If the chain speed reducing mechanism 30 that reduces the rotation speed of the second motor 3 in two stages is provided as in the example shown in FIG. 7, the output torque of the second motor 3 can be significantly amplified before being transmitted to the front wheels 5. Accordingly, the second motor 3 can be downsized. The second chain speed reducing shaft 32 and the third chain speed reducing shaft 33 in the chain speed reducing mechanism 30 are disposed separately in the vehicle width direction. Thus, as shown in FIG. 8, the chain speed reducing mechanism 30 having the three rotating shafts, the first chain speed reducing shaft 31, the second chain speed reducing shaft 32, and the third chain speed reducing shaft 33, can be compactly disposed in the width direction of the vehicle body. Moreover, the space in the width direction of the vehicle body can be effectively used to dispose the chain speed reducing mechanism 30. Furthermore, compared with a gear power transmission mechanism, for example, a chain power transmission mechanism like the chain speed reducing mechanism 30 (also the chain power transmission mechanism 20) allows for a longer shaft-to-shaft distance between two rotating shafts that transmit torque to each other, which increases the flexibility of arrangement. Thus, the second motor 3 and the front wheel-side driving system 17 can be installed with higher efficiency in an existing FR vehicle or an FR vehicle-based four-wheel-drive vehicle.

Figure 9:
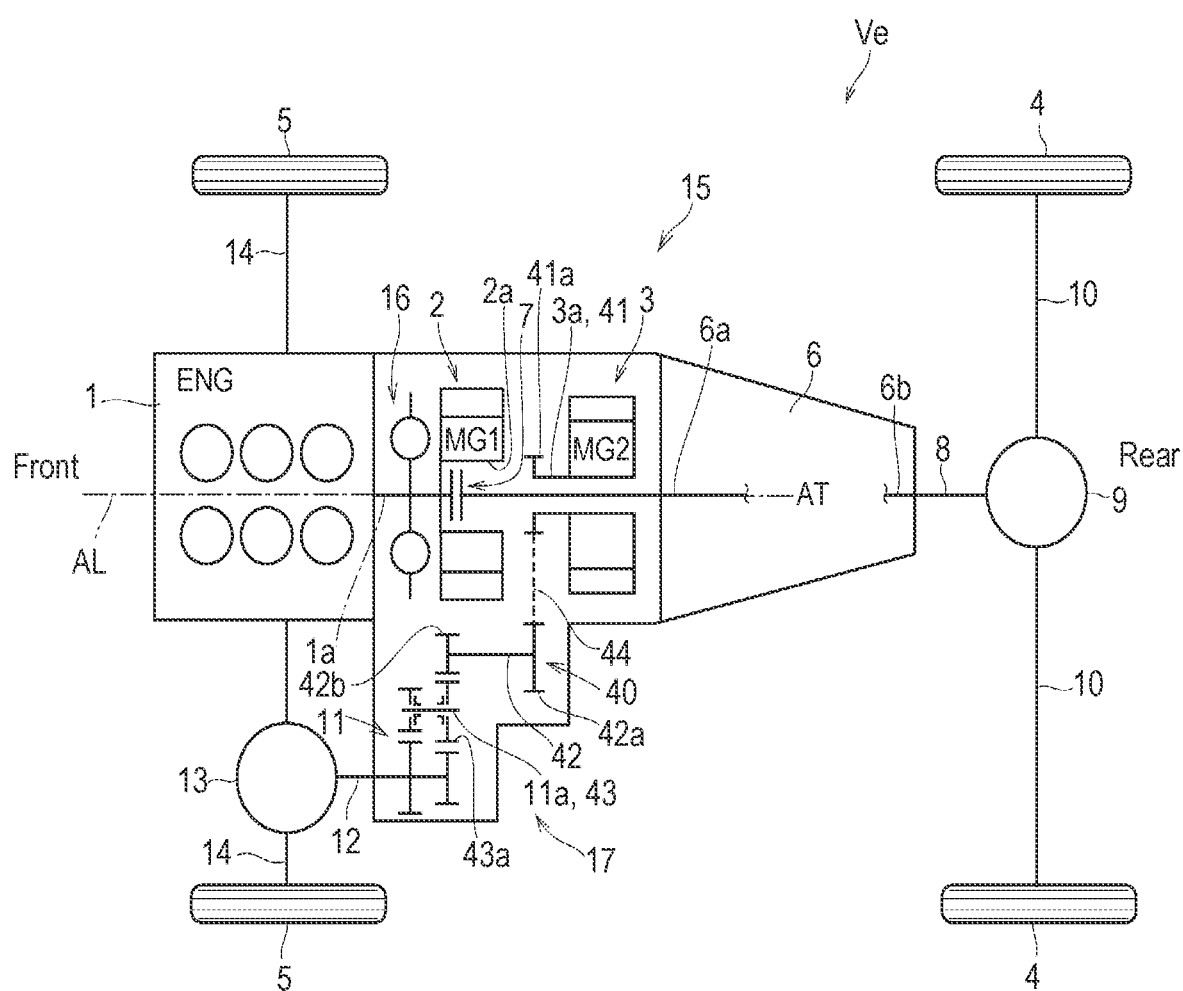
FIG. 9 is a view showing another example (a configuration in which the first motor is disposed on the front side and the second motor is disposed on the rear side, and a four-shaft speed reducing mechanism is provided between the second motor and the front wheels) of the hybrid vehicle that is the subject of the present disclosure.

The vehicle Ve shown in FIG. 9 includes a speed reducing mechanism 40 that amplifies the output torque of the second motor 3 in two stages, between the engine 1 and the automatic transmission 6, between the second motor 3 and the front wheels 5. Specifically, in the example shown in FIG. 9, the speed reducing mechanism 40 is provided between the second motor 3 and the power transmission mechanism 11. The speed reducing mechanism 40 has a first speed reducing shaft 41, a second speed reducing shaft 42 having a lower rotation speed than the first speed reducing shaft 41, and a third speed reducing shaft 43 having a lower rotation speed than the second speed reducing shaft 42. The first speed reducing shaft 41 is formed so as to rotate integrally with the rotating shaft 3a of the second motor 3, and has a sprocket 41a mounted at a leading end (the end on the left side in FIG. 9). The second speed reducing shaft 42 is disposed parallel to the first speed reducing shaft 41 in the vehicle width direction, and has a sprocket 42a, having a larger diameter than the sprocket 41a, mounted at an end on one side (the right side in FIG. 9). At an end of the second speed reducing shaft 42 on the other side (the left side in FIG. 9), a gear 42b having a smaller diameter than a gear 43a of the third speed reducing shaft 43 to be described later is mounted. The third speed reducing shaft 43 doubles as the input shaft 11a of the power transmission mechanism 11, and has the gear 43a mounted at a leading end (the end on the right side in FIG. 9). A chain 44 is wound between the sprocket 41a and the sprocket 42a. The gear 42b and the gear 43a mesh with each other. Accordingly, the second speed reducing shaft 42 has a lower rotation speed than the first speed reducing shaft 41. The third speed reducing shaft 43 has a lower rotation speed than the second speed reducing shaft 42. Thus, the speed reducing mechanism 40 amplifies the output torque of the second motor 3 in two stages between the second motor 3 and the front wheels 5.

Figure 10:
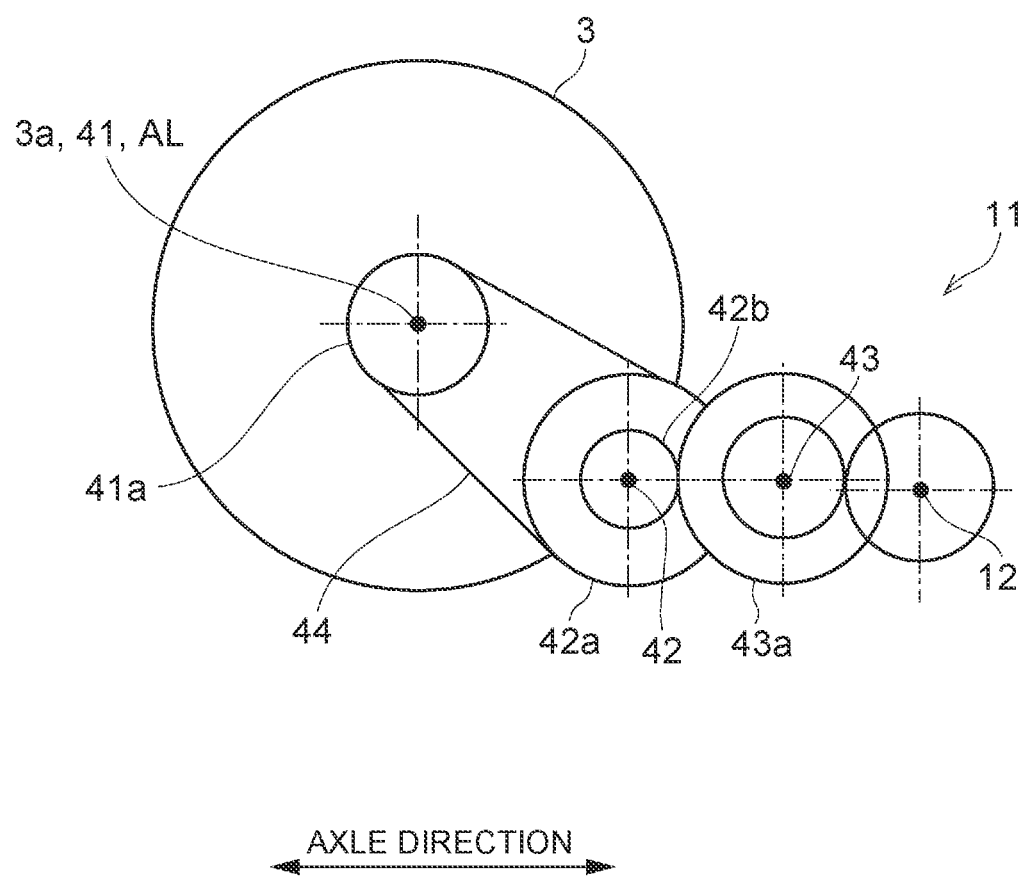
FIG. 10 is a view of the configuration shown in FIG. 9, as seen from the vehicle front side, showing the positional relationship among rotating shafts of the four-shaft speed reducing mechanism.

In the vehicle Ve shown in FIG. 9, the third speed reducing shaft 43 is coupled, so as to be able to transmit power, to the front propeller shaft 12 that transmits power to the front wheels 5 through the front differential gear 13. The front differential gear 13 is a so-called final reduction gear on the side of the front wheels 5, and reduces the rotation speed of the front propeller shaft 12 when transmitting power from the front propeller shaft 12 to the front driving shaft 14. Therefore, the front propeller shaft 12 has a lower rotation speed than the third speed reducing shaft 43, and corresponds to the fourth speed reducing shaft as termed in the embodiment of the present disclosure. Thus, in the vehicle Ve shown in FIG. 9, the speed reducing mechanism 40 having four shafts in total is formed as shown in FIG. 10.

Thus, in the vehicle Ve shown in FIG. 9, the speed reducing mechanism 40 is provided between the second motor 3 and the power transmission mechanism 11 to reduce the rotation speed of the second motor 3 in two stages. The speed reducing mechanism 40 has the four rotating shafts including the rotating shaft 3a of the second motor 3 and the front propeller shaft 12, between the second motor 3 and the front wheels 5, and of these rotating shafts, the fourth speed reducing shaft (front propeller shaft 12) located nearest to the front wheels and the front differential gear 13 that is the final reduction gear for the front wheels 5 are coupled together so as to be able to transmit power. Thus, the rotation speed of the second motor 3 can be reduced in three stages between the second motor 3 and the front wheels 5. Therefore, the output torque of the second motor 3 can be significantly amplified before being transmitted to the front wheels 5. By extension, the second motor 3 can be downsized and installed with higher efficiency in an existing FR vehicle or an FR vehicle-based four-wheel-drive vehicle.

The operational effects of the present disclosure will be described. The hybrid vehicle of the present disclosure is configured as a four-wheel-drive vehicle or an all-wheel-drive vehicle which has the engine, the first motor, and the second motor as driving power sources and of which both the front and rear wheels are driven. The engine and the first motor are driving power sources in the rear wheel-side driving system and drive the rear wheels. The second motor is a driving power source in the front wheel-side driving system and drives the front wheels. The rear wheel-side driving system and the front wheel-side driving system are independent of each other, and no torque is transmitted between these two driving systems. This means that the second motor does not transmit torque to the front wheel-side driving system. On the other hand, the second motor is disposed on the rotational axis of the crankshaft of the engine along with the first motor. According to the present disclosure, therefore, a hybrid four-wheel-drive or all-wheel-drive vehicle is configured in which the first motor and the second motor are disposed coaxially with the longitudinally positioned engine and these engine and two motors serve as driving power sources. Thus, it is possible to configure a two motor-type hybrid four-wheel-drive or all-wheel-drive vehicle without making major changes to the vehicle body structure or layout of an existing vehicle, such as a so-called FR vehicle of which the rear wheels are driven by an engine longitudinally positioned on the front side of the vehicle, or a four-wheel-drive vehicle based on such an FR vehicle.

The hybrid vehicle of the present disclosure includes the starter clutch between the first motor and the rear wheels. Specifically, the starter clutch is provided on the output side of the engine in the rear wheel-side driving system. It is possible to smoothly start the hybrid vehicle of the present disclosure by controlling the engagement state of this starter clutch when transmitting the engine torque to the rear wheels to start the vehicle. This can eliminate the need for a torque converter that is conventionally commonly used. Disengaging the starter clutch can disconnect the engine and the first motor from the rear wheel-side driving system. In this state, the hybrid vehicle can travel by the motor torque output by the second motor in the front wheel-side driving system. This means that the hybrid vehicle can travel also as an electric vehicle using the second motor as a driving power source.

The hybrid vehicle of the present disclosure includes the automatic transmission between the first motor and the rear wheels. Specifically, the automatic transmission is provided on the output side of the engine in the rear wheel-side driving system. It is possible to appropriately vary the engine speed by this automatic transmission and transmit the engine torque to the rear wheels to generate appropriate driving power. Moreover, in the hybrid vehicle of the present disclosure, the clutch mechanism of the automatic transmission can function as the starter clutch as described above. This can eliminate the need for a starter clutch as described above and a torque converter.

In the hybrid vehicle of the present disclosure, both the first motor and the second motor are disposed coaxially with the engine, and the second motor of these motors is disposed nearer to the engine in the front-rear direction of the vehicle. The engine is disposed in longitudinal position on the front side of the vehicle. Thus, the second motor is disposed nearer to the front wheels in the front-rear direction of the vehicle than when the second motor is disposed on the output side of the first motor. In the hybrid vehicle of the present disclosure, therefore, the distance between the second motor and the front wheels in the front wheel-side driving system 17 can be reduced, compared with when the second motor is disposed on the output side of the first motor. For example, the length of the propeller shaft in the front wheel-side driving system 17 can be reduced. As the propeller shaft is shortened, the size and weight can be reduced. Moreover, the natural frequency of the rotating and vibrating system including the propeller shaft can be raised, so that it is possible to reduce resonance of the front wheel-side driving system during normal travel (during cruise or constant-speed travel) and improve the NV performance of the hybrid vehicle. In addition, the amount of torsion of the propeller shaft during power transmission can be reduced. As a result, the responsiveness of driving power in the front wheel-side driving system 17 can be improved.

In the hybrid vehicle of the present disclosure, both the first motor and the second motor are disposed coaxially with the engine, and one of the first motor and the second motor that has a larger outside diameter is disposed nearer to the engine in the front-rear direction of the vehicle. In the hybrid vehicle of the present disclosure, therefore, the motors are disposed in the order of decreasing outside diameter on the output side of the engine that has generally the largest outside diameter in the driving unit. Thus, the space around the output side of the engine can be effectively used. Since the outside diameters of the motors can be made smaller in the direction away from the engine and toward the rear wheels, interference with an existing structure in a space under the vehicle floor can be avoided or reduced, and a space for occupants inside the vehicle cabin can be secured. Thus, the motors can be installed with high efficiency in an existing FR vehicle or an FR vehicle-based four-wheel-drive vehicle to configure the hybrid vehicle.

The hybrid vehicle of the present disclosure includes the chain speed reducing mechanism between the second motor and the front wheels. The chain speed reducing mechanism has the three rotating shafts, the first chain speed reducing shaft, the second chain speed reducing shaft, and the third chain speed reducing shaft, between the second motor and the front wheels. The chain is wound around the sprocket mounted on each rotating shaft to form the chain speed reducing mechanism. Specifically, the chain speed reducing mechanism that reduces the rotation speed of the second motor in two stages is composed of the chain power transmission mechanism in which the chain is wound between the first chain speed reducing shaft and the second chain speed reducing shaft and of a chain power transmission mechanism in which the chain is wound between the second chain speed reducing shaft and the third chain speed reducing shaft. Thus, in the hybrid vehicle of the present disclosure, the output torque of the second motor can be significantly amplified before being transmitted to the front wheels. By extension, the second motor can be downsized. In the hybrid vehicle of the present disclosure, the second chain speed reducing shaft and the third chain speed reducing shaft are disposed separately in the width direction of the vehicle body. Thus, the space in the width direction of the vehicle body can be effectively used and the second motor and the front wheel-side driving system can be installed with high efficiency to configure the hybrid vehicle.

The hybrid vehicle of the present disclosure further includes the speed reducing mechanism between the second motor and the front wheels. This speed reducing mechanism is composed of, for example, a speed reducing gear pair and a chain power transmission mechanism, and reduces the rotation speed of the second motor in two stages. The speed reducing mechanism has four rotating shafts including the rotating shaft of the second motor, between the second motor and the front wheels, and of these rotating shafts, the fourth speed reducing shaft located nearest to the front wheels and the front wheel-side differential gear that is the final reduction gear for the front wheels are coupled together so as to be able to transmit power. Thus, the rotation speed of the second motor can be reduced in three stages between the second motor and the front wheels. In the hybrid vehicle of the present disclosure, therefore, the output torque of the second motor can be significantly amplified before being transmitted to the front wheels. By extension, the second motor can be downsized.

When the hybrid vehicle of the present disclosure employs a straight engine as the engine serving as a driving power source, the intake system and the exhaust system of the longitudinally positioned engine are respectively connected to both side parts of the engine in the width direction of the vehicle body, i.e., separately connected to the intake side and the exhaust side of the engine, as described above. The propeller shaft of the front wheel-side driving system is disposed adjacent to the engine, on the intake side of the engine in the width direction of the vehicle body. Thus, it is possible to dispose the front wheel-side propeller shaft and the front wheel-side driving system by effectively using the space around the intake side on the opposite side from the exhaust system, which includes the exhaust pipe and the catalyst, so as to avoid interference with the exhaust system. It is therefore possible to install particularly the front wheel-side driving system with high efficiency to configure the hybrid vehicle, without making major changes to the vehicle body structure or layout of an existing vehicle.

What is claimed is:

1. A hybrid vehicle comprising:
  an engine disposed on a front side of a vehicle body, in longitudinal position with a direction of a rotational axis of a crankshaft oriented along a front-rear direction of the vehicle body;
  an automatic transmission that is disposed coaxially with the engine, and that increases and decreases engine torque output by the engine;
  a first motor that functions to generate electricity by being driven by the engine torque;
  a rear wheel to which at least one of the engine torque and first motor torque output by the first motor is transmitted to generate driving power;
  a second motor that outputs second motor torque;
  a front wheel to which the second motor torque is transmitted to generate driving power; and
  a power transmission mechanism having a plurality of speed reducing gear pairs, and that increases and decreases the driving power of the front wheel, wherein
  both the first motor and the second motor are disposed between the engine and the automatic transmission, coaxially with the engine and the automatic transmission,
  the first motor is coupled to the engine, and
  the second motor is coupled to the power transmission mechanism without being coupled to the engine and the automatic transmission.

2. The hybrid vehicle according to claim 1, further comprising a starter clutch that permits or interrupts torque transmission between the engine and the automatic transmission and that is provided between the engine and the automatic transmission.

3. The hybrid vehicle according to claim 1, wherein the automatic transmission has a clutch mechanism that permits or interrupts torque transmission between an input shaft and an output shaft of the automatic transmission.

4. The hybrid vehicle according to claim 1, wherein the first motor and the second motor are disposed in order of the second motor and the first motor from a side nearer to the engine in the front-rear direction of the vehicle body.

5. The hybrid vehicle according to claim 1, wherein
  the first motor and the second motor are different from each other in maximum outside diameter, and
  the first motor and the second motor are disposed in order of one motor of the first motor and the second motor that has a larger maximum outside diameter and the other motor that has a smaller maximum outside diameter, from a side nearer to the engine in the front-rear direction of the vehicle body.

6. The hybrid vehicle according to claim 1, wherein
  the engine is a straight engine having a plurality of cylinders disposed in one row in the direction of the rotational axis of the crankshaft,
  the engine has an intake side to which an intake system is connected, and an exhaust side which is an opposite side from the intake side in a width direction of the vehicle body and to which an exhaust system is connected,
  the power transmission mechanism has a front wheel-side differential gear that is coupled to the front wheel, and a front wheel-side propeller shaft that transmits torque between the second motor and the front wheel-side differential gear, and
  the front wheel-side propeller shaft is disposed on the intake side of the engine in the width direction of the vehicle body, with a direction of a rotational axis of the front wheel-side propeller shaft oriented along the front-rear direction of the vehicle body.

7. A hybrid vehicle comprising:
an engine disposed on a front side of a vehicle body, in longitudinal position with a direction of a rotational axis of a crankshaft oriented along a front-rear direction of the vehicle body;
an automatic transmission that is disposed coaxially with the engine, and that increases and decreases engine torque output by the engine;
a first motor that functions to generate electricity by being driven by the engine torque;
a rear wheel to which at least one of the engine torque and first motor torque output by the first motor is transmitted to generate driving power;
a second motor that outputs second motor torque;
a front wheel to which the second motor torque is transmitted to generate driving power; and
a power transmission mechanism that increases and decreases the driving power of the front wheel, wherein
both the first motor and the second motor are disposed between the engine and the automatic transmission, coaxially with the engine and the automatic transmission,
the first motor is coupled to the engine,
the second motor is coupled to the power transmission mechanism without being coupled to the engine and the automatic transmission,
the power transmission mechanism has a chain speed reducing mechanism that amplifies the second motor torque in two stages,
the chain speed reducing mechanism has a first chain speed reducing shaft that rotates integrally with a rotating shaft of the second motor, a second chain speed reducing shaft having a lower rotation speed than the first chain speed reducing shaft, and a third chain speed reducing shaft having a lower rotation speed than the second chain speed reducing shaft, and
the second chain speed reducing shaft and the third chain speed reducing shaft are disposed on opposite sides of the rotational axis of the crankshaft in a width direction of the vehicle body.

8. The hybrid vehicle according to claim 7, further comprising a starter clutch that permits or interrupts torque transmission between the engine and the automatic transmission and that is provided between the engine and the automatic transmission.

9. The hybrid vehicle according to claim 7, wherein
the first motor and the second motor are different from each other in maximum outside diameter, and
the first motor and the second motor are disposed in order of one motor of the first motor and the second motor that has a larger maximum outside diameter and the other motor that has a smaller maximum outside diameter, from a side nearer to the engine in the front-rear direction of the vehicle body.

10. A hybrid vehicle comprising:
an engine disposed on a front side of a vehicle body, in longitudinal position with a direction of a rotational axis of a crankshaft oriented along a front-rear direction of the vehicle body;
an automatic transmission that is disposed coaxially with the engine, and that increases and decreases engine torque output by the engine;
a first motor that functions to generate electricity by being driven by the engine torque;
a rear wheel to which at least one of the engine torque and first motor torque output by the first motor is transmitted to generate driving power;
a second motor that outputs second motor torque;
a front wheel to which the second motor torque is transmitted to generate driving power; and
a power transmission mechanism that increases and decreases the driving power of the front wheel, wherein
both the first motor and the second motor are disposed between the engine and the automatic transmission, coaxially with the engine and the automatic transmission,
the first motor is coupled to the engine,
the second motor is coupled to the power transmission mechanism without being coupled to the engine and the automatic transmission,
the power transmission mechanism has a speed reducing mechanism that amplifies the second motor torque in two stages,
the speed reducing mechanism has a first speed reducing shaft that rotates integrally with a rotating shaft of the second motor, a second speed reducing shaft having a lower rotation speed than the first speed reducing shaft, and a third speed reducing shaft having a lower rotation speed than the second speed reducing shaft, and
the third speed reducing shaft is coupled, so as to be able to transmit power, to a fourth speed reducing shaft, the fourth speed reducing shaft transmits torque to the front wheel through a front wheel-side differential gear coupled to the front wheel.

11. The hybrid vehicle according to claim 10, further comprising a starter clutch that permits or interrupts torque transmission between the engine and the automatic transmission and that is provided between the engine and the automatic transmission.

12. The hybrid vehicle according to claim 10, wherein
the first motor and the second motor are different from each other in maximum outside diameter, and
the first motor and the second motor are disposed in order of one motor of the first motor and the second motor that has a larger maximum outside diameter and the other motor that has a smaller maximum outside diameter, from a side nearer to the engine in the front-rear direction of the vehicle body.

* * * * *